United States Patent
Kumar et al.

(10) Patent No.: US 9,161,029 B1
(45) Date of Patent: Oct. 13, 2015

(54) SYSTEMS AND METHODS FOR DETECTING DEFECTIVE PIXELS IN A VIDEO SEQUENCE

(71) Applicant: Interra Systems, Inc., Cupertino, CA (US)

(72) Inventors: Bhupender Kumar, Palwal (IN); Shekhar Madnani, Noida (IN)

(73) Assignee: INTERRA SYSTEMS, INC., Cupertino, CA (US)

( * ) Notice: Subject to any disclaimer, the term of this patent is extended or adjusted under 35 U.S.C. 154(b) by 0 days.

(21) Appl. No.: 14/323,359

(22) Filed: Jul. 3, 2014

(51) Int. Cl.
*H04N 9/64* (2006.01)
*H04N 17/02* (2006.01)
*G06T 5/00* (2006.01)
*G06T 5/50* (2006.01)

(52) U.S. Cl.
CPC ............... *H04N 17/02* (2013.01); *G06T 5/005* (2013.01); *G06T 5/50* (2013.01); *G06T 2207/10016* (2013.01); *G06T 2207/10024* (2013.01)

(58) Field of Classification Search
USPC ........ 348/246, 222.1, 223.1, 228.1, 237, 239, 348/241, 243, 247, 208.99, 184, 609; 382/162, 163, 166, 167, 154, 236, 238, 382/254, 321; 375/240.03, 240.12, 240.16, 375/240.24, 240.27
See application file for complete search history.

(56) References Cited

U.S. PATENT DOCUMENTS

| | | | | |
|---|---|---|---|---|
| 6,956,960 | B2 * | 10/2005 | Kondo et al. | 382/107 |
| 8,094,936 | B2 * | 1/2012 | Woo et al. | 382/173 |
| 8,259,198 | B2 * | 9/2012 | Cote et al. | 348/246 |
| 8,525,895 | B2 * | 9/2013 | Cote et al. | 348/222.1 |
| 2006/0125939 | A1 * | 6/2006 | Yoneda | 348/246 |
| 2008/0158396 | A1 * | 7/2008 | Fainstain et al. | 348/246 |
| 2008/0298696 | A1 * | 12/2008 | Kakarala et al. | 382/238 |
| 2009/0295930 | A1 * | 12/2009 | Deng | 348/208.99 |
| 2010/0027900 | A1 * | 2/2010 | Tetsukawa et al. | 382/236 |
| 2011/0063525 | A1 * | 3/2011 | Chiou et al. | 348/739 |
| 2011/0090381 | A1 * | 4/2011 | Cote et al. | 348/246 |
| 2011/0149123 | A1 * | 6/2011 | Matsuoka | 348/247 |
| 2012/0050563 | A1 * | 3/2012 | Cote et al. | 348/223.1 |

* cited by examiner

*Primary Examiner* — Paulos M Natnael
*Assistant Examiner* — Mustafizur Rahman
(74) *Attorney, Agent, or Firm* — Balser & Grell IP Law

(57) ABSTRACT

Systems and methods for detecting defective pixels in a video sequence having a plurality of frames, the method comprising determining one or more frames of a single scene and determining a plurality of buffers of each frame related to the single scene, detecting one or more candidate pixels for a first predefined number of frames, tracking the detected one or more candidate pixels for a second predetermined number of frames, validating the one or more candidate pixels for presence of defect and marking a candidate pixel from the one or more candidate pixels as a defective pixel based on one or more predefined conditions.

10 Claims, 10 Drawing Sheets

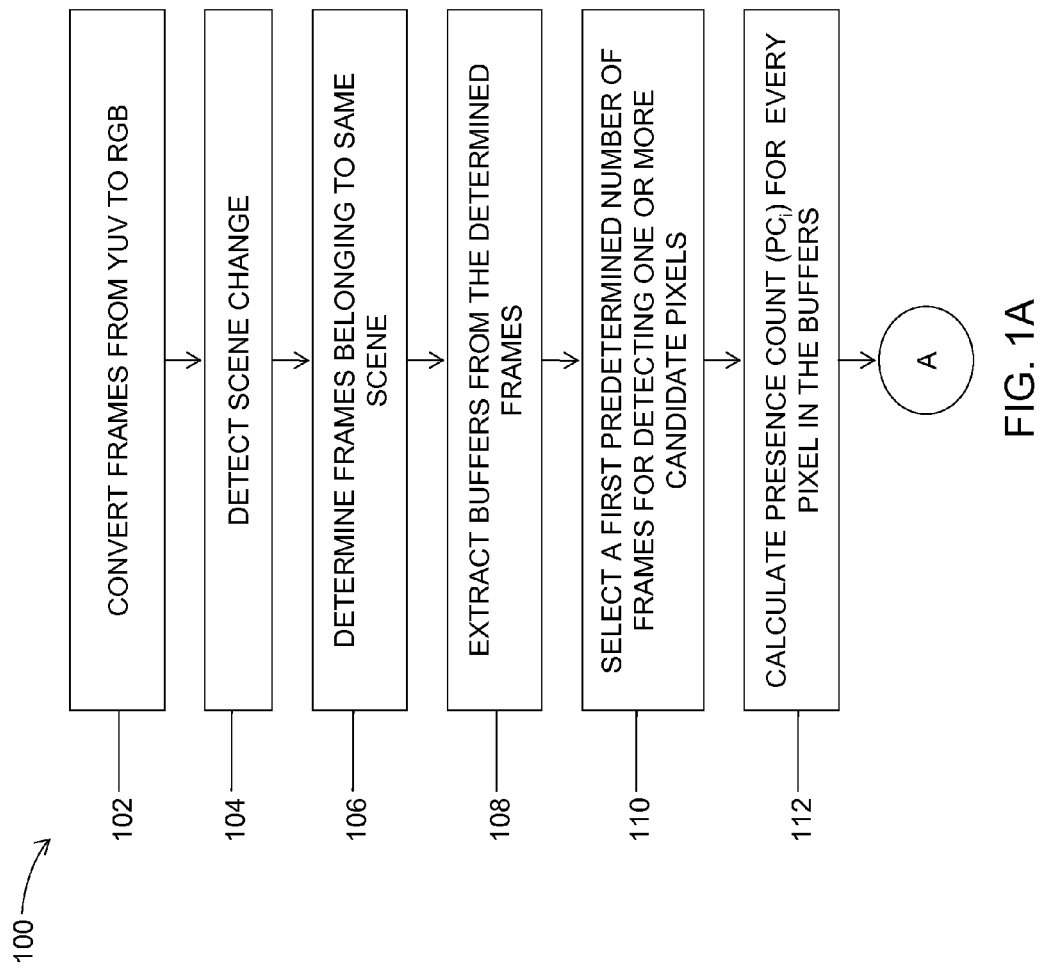

| CANDIDATE FLAG | MOTION AREA FLAG | DEFECTIVE BEHAVIOR FLAG |
|---|---|---|
| 0 | 0 | 0 |
| 1 | 0 | 1 |
| 0 | 1 | 2 |
| 1 | 1 | 3 |

FIG. 7

SYSTEMS AND METHODS FOR DETECTING DEFECTIVE PIXELS IN A VIDEO SEQUENCE

FIELD OF THE INVENTION

The present disclosure relates to systems and methods for detecting defective pixels in a video sequence. Particularly, the present disclosure relates to a technique for detecting defective pixels caused by malfunction of an image sensor in an imaging device.

BACKGROUND OF THE INVENTION

A number of digital imaging devices are in common use today for capturing images and videos including digital still cameras and digital video cameras. Such digital imaging devices are equipped with an image sensor designed to convert light received via lenses into electrical signals. A charge coupled device (CCD) sensor and a complementary metal oxide semiconductor (CMOS) sensor are a few examples of the image sensors included in an imaging device. The image sensor includes multiple photodiodes provided corresponding to multiple pixels constituting an image and arranged to output pixel data representing pixel values of the corresponding pixels. Further, Images/Videos are generally captured in RGB format. In capturing device, there are sensor arrays containing sensors for each pixel position. As the data is captured in RGB format, but the visible light contains other colours also, so filters are provided before these sensors to filter out unwanted colour frequencies. Now to capture R, G, B value at each pixel, one would require 3 filters as well as 3 sensors for each pixel. This is not an economic way to capture any image, so some colour filter arrays are employed to capture the image with 3 times less sensors. The colour filters filter the light by wavelength range, such that the separate filtered intensities include information about the specific colour of light. For example, the Bayer filter is used for separating the R,G,B color information in a way that each quartet of sensors contains two diagonally opposite sensors for Green, one for Red and one for Blue. The raw image data captured by the image sensor is then converted to a full-colour image (with intensities of all three primary colours represented at each pixel) by a demosaicing algorithm which is tailored for each type of colour filter.

The photodiodes in a digital imaging device may be aligned as an array of M×N pixels, with the incident illumination at location (i,j) denoted by I(i,j). Each photodiode location produces an output Y(i,j), which depends on the incident illumination I(i,j) according to a linear function $Y(i,j)=m\ I(i,j)+b$; where m is the sensitivity and b is the bias or offset of the defect. In an ideal scenario, the sensitivity m is unity and the bias b is zero, such that the output always directly reflects the input. Due to malfunction of the sensor the sensitivity may either be greater than 1 or may be 0 and the bias may be very high thus resulting in a pixel value higher or lower than the incident illumination. Malfunction of any of the photodiodes can result in certain discrepancy in the original pixel values, thus in an output image a higher or lower pixel value may be displayed. Depending upon the values of non-unity sensitivity and a non-zero bias, defective pixels can be of various types namely Dead Pixels, Stuck Pixels and Hot Pixels. Dead Pixels are produced by sensors with zero sensitivity and low or zero bias. Stuck Pixels are produced by sensors with zero sensitivity and high bias. Hot Pixels are produced by sensors with non-unity sensitivity and/or non-zero bias.

A number of techniques have been proposed for detecting any defective pixel caused by malfunction of image sensors among multiple pixels constituting a taken image or video frame. A prior art techniques disclose for example, detecting a white defect as a defective pixel in a single plate color video camera. The prior art techniques check the absence of a high-frequency component in a target pixel set as a processing object based on the frequency characteristics of peripheral pixels with different color filters from the color filter set on the target pixel, and identify the target pixel as a defective pixel in response to subsequent detection of the presence of the high frequency component in the target pixel. However, the existing techniques are either ineffective or inefficient in detecting defective pixels in a video sequence that comprises of a plurality of frames.

The erroneous sensors produce a pixel value that looks pretty much different from its actual value and the pixel values in the surrounding region. Although these erroneous sensors are detected at the time of manufacturing of capturing device and some error-correction mechanism is also provided for the same, still these problems in sensors can also occur in field working. The systems and methods described in the present disclosure deal with detection of such type of defective pixels present in a video in an efficient manner.

BRIEF SUMMARY OF THE INVENTION

It will be understood that this disclosure is not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an embodiment, a method for detecting defective pixels in a video sequence is described. The video sequence generally comprises of a plurality of frames, wherein each frames includes a matrix of pixels. The method comprises determining one or more frames relating to a single scene and determining a plurality of buffers of each frame related to the single scene. Each buffer is a matrix of predetermined size containing pixels. The determined set of frames and the related buffers are then utilized for detecting one or more candidate pixels and then tracking and validating the detected candidate pixels for errors in the whole video sequence. A first set of predefined number of frames relating to a single scene are utilized for detecting one or more candidate pixels that may contain error. Then, a second set of predefined number of frames relating to a single scene are utilized for tracking and validating the candidate pixels thus confirming that the candidate pixel is indeed a defective pixel. The method of detecting the one or more candidate pixels comprises of calculating a presence count for each pixel of each buffer; calculating an edge count for each pixel of each buffer; and storing a pixel location of a pixel as a candidate pixel if cumulative difference between the presence count and the edge count for pixels in the first predefined number of frames is greater than a predefined first threshold. Thereafter the detected candidate pixels are tracked for the second predetermined number of frames by setting a candidate flag of each of the one or more candidate pixels based on the presence count and edge count of the one or more candidate pixels; setting a motion area flag of each of the one or more candidate pixels based on a count of motion pixels in the neighborhood of the candidate, wherein the neighborhood is of a predetermined size; and calculating a minimum pixel value and a maximum pixel value for each candidate pixel and each pixel in the neighborhood of each of the candidate pixels in the second predetermined number of frames. Then the candidate pixel is validated by determining a defective behavior flag of each of the one or more candidate pixels based on the candidate flag and the motion area flag of each of the one or more candidate pixels; determining a sum of the candidate flag and a sum of the motion area flag for each of the one or more candidate pixels over all the second predetermined number of frames; and finally marking a candidate pixel from the one or more candidate pixels as a defective pixel based on one or more predefined conditions.

In an aspect, the one or more conditions for marking a candidate pixel as a defective pixel comprises of comparing the sum of candidate flag of the candidate pixel with a second predetermined threshold and comparing the sum of motion area flag of the candidate pixel with a third predetermined threshold, if the sum of candidate flag of the candidate pixel is greater than the second predetermined threshold and the sum of motion area flag of the candidate pixel is greater than the third predetermined threshold, then comparing a ratio of total count of the sum of defective behavior flag of the candidate pixel that is not visible in motion area to the sum of motion area flag of the candidate pixel over the second predetermined number of frames with a fourth predetermined threshold and comparing the sum of defective behavior flag of the candidate pixel that is not visible in motion area over the second predetermined number of frames with a fifth predetermined threshold, if the ratio is greater than the fourth predetermined threshold or if the sum of defective behavior flag of the candidate pixel that is not visible in motion area is greater than the fifth predetermined threshold then the pixel is discarded, else comparing the difference of the maximum value and the minimum value of the candidate pixel in the second predetermined number of frames with a sixth predetermined threshold, if the difference is greater than the sixth predetermined threshold then the pixel is discarded else a min-threshold and a max-threshold is calculated based on the maximum value and minimum value of the candidate pixel over second predetermined number of frames; calculating a pixel count in the predetermined neighborhood of candidate pixel having minimum value and maximum value within the min-threshold and max-threshold; and comparing the pixel count with a seventh predetermined threshold value, if the pixel count is less than the seventh predetermined threshold value over the second predetermined number of frames, then the candidate pixel is marked as the defective pixel.

In another embodiment, a system for detecting defective pixels in a video sequence having a plurality of frames is described. The system comprising a processor and an associated memory for storing one or more modules, wherein the memory comprises of a buffer creation module configured for determining one or more frames of a single scene and determining a plurality of buffers of each frame related to the single scene, wherein each buffer consists of a matrix of pixels; a candidate pixel detection module configured for detecting one or more candidate pixels for a first predefined number of frames, the steps comprising of: calculating a presence count for each pixel of each buffer; calculating an edge count for each pixel of each buffer; and storing a pixel location of a pixel as a candidate pixel if cumulative difference between the presence count and the edge count for pixels in the first predefined number of frames is greater than a predefined first threshold; a candidate pixel tracking module configured for tracking the detected one or more candidate pixels for a second predetermined number of frames, the steps comprising of: setting a candidate flag of each of the one or more candidate pixels based on the presence count and edge count of the one or more candidate pixels; setting a motion area flag of each of the one or more candidate pixels based on a count of motion pixels in the neighborhood of the candidate, wherein the neighborhood is of a predetermined size; and calculating a minimum pixel value and a maximum pixel value for each candidate pixel and each pixel in the neighborhood of each of the candidate pixels in the second predetermined number of frames; a candidate pixel validation module configured for validating the one or more candidate pixels for presence of defect, the steps comprising of: determining a defective behavior flag of each of the one or more candidate pixels based on the candidate flag and the motion area flag of each of the one or more candidate pixels; determining a sum of the candidate flag and a sum of the motion area flag for each of the one or more candidate pixels over all the second predetermined number of frames; marking a candidate pixel from the one or more candidate pixels as a defective pixel on one or more predefined conditions, the processor being configured for accessing the memory and executing the modules stored in the memory.

Further objects, advantages and novel features of the present invention are apparent from the following detailed description when read in conjunction with the appended claims and attached drawing.

BRIEF DESCRIPTION OF THE DRAWINGS

FIG. 1A and FIG. 1B represent a flowchart describing the method for detecting defective pixels present in a video sequence, according to an embodiment.

FIG. 7 represents a table illustrating the determination of the defective behavior flag.

DETAILED DESCRIPTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1B:
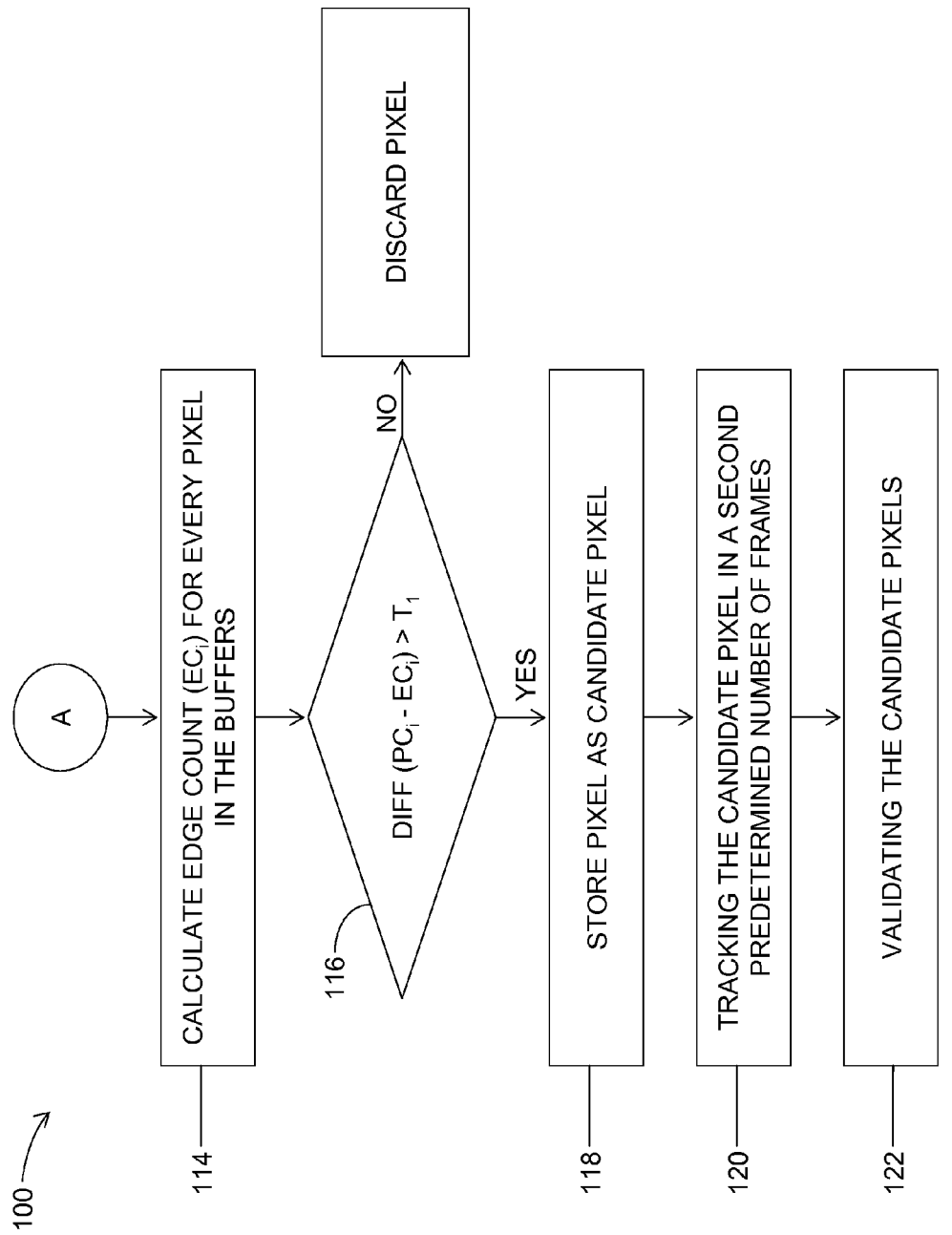

FIG. 1A and FIG. 1B represent a flowchart describing the method for detecting defective pixels present in a video sequence, according to an embodiment. The video sequence may comprise of various scenes and a plurality of frames related to the various scenes. Each frame comprise of a matrix of pixels and related pixel values. A video is captured in RGB format and then for storing the video data it is typically converted from RGB format to YUV format and then encoded using different type of encoders. According to the present method (100), the stored YUV that may be uncompressed is first converted back to the RGB format at step (102). The RGB video data may comprise of a plurality of frames. At step (104), a scene change detection process is executed for determining (106) one or more frames belonging to a single scene. In an aspect, the histogram of a current frame is compared with the histogram of a previous frame for detecting scene change, and if the difference between the histograms is above a certain threshold then it is confirmed that the current frame relates to a scene different from the scene of the previous frame. In another aspect, the one or more frames of the single scene are determined based on one of the technique such as Histogram difference, Edge Change Ratio, Motion Vector Statistics, and the like. Upon determining the frames belonging to the same scene, a plurality of buffers of each frame are extracted (108). Each frame consists of a matrix of pixels and such a matrix of pixels may be divided into a number of buffers comprising a matrix of pixels. For example, a 4×4 frame may be divided into four 2×2 buffers that may further be utilized for getting three sets of four 2×2 buffers wherein each set of four 2×2 buffers corresponds to the Red, Green, and Blue intensities. Such buffers are then further analyzed for determining the defects in each frame.

As the problem of defective pixel will be always there in an imaging device after the first instance, so the complete sequence captured by the same imaging device will have the similar problem of defective pixels at similar locations throughout the sequence. The present method considers the whole sequence of frames pertaining to a single shot captured by same capturing device to detect and validate the defective pixels. The current method works in two stages. The frames belonging to a same scene are divided into a first predetermined number of frames and a second predetermined number of frames. The first predetermined number of frames that may be the initial set of frames is utilized or extracted (110) for detecting one or more candidate pixels and the second predetermined number of frames that may be the subsequent frames is utilized for tracking and validating only the determined candidate pixels in the second set of frames. For example, there may be N frames relating to a particular scene. These N frames are divided into two parts, the first M frames are considered for Candidate detection stage and remaining N-M frames are considered for candidate tracking stage. The candidate pixels are the pixels that show certain properties of a defective pixel in the first predetermined number of frames and the tracking and validation steps confirm that the candidate pixels are indeed defective by checking the candidate pixels in the second predetermined number of frames.

Figure 2:
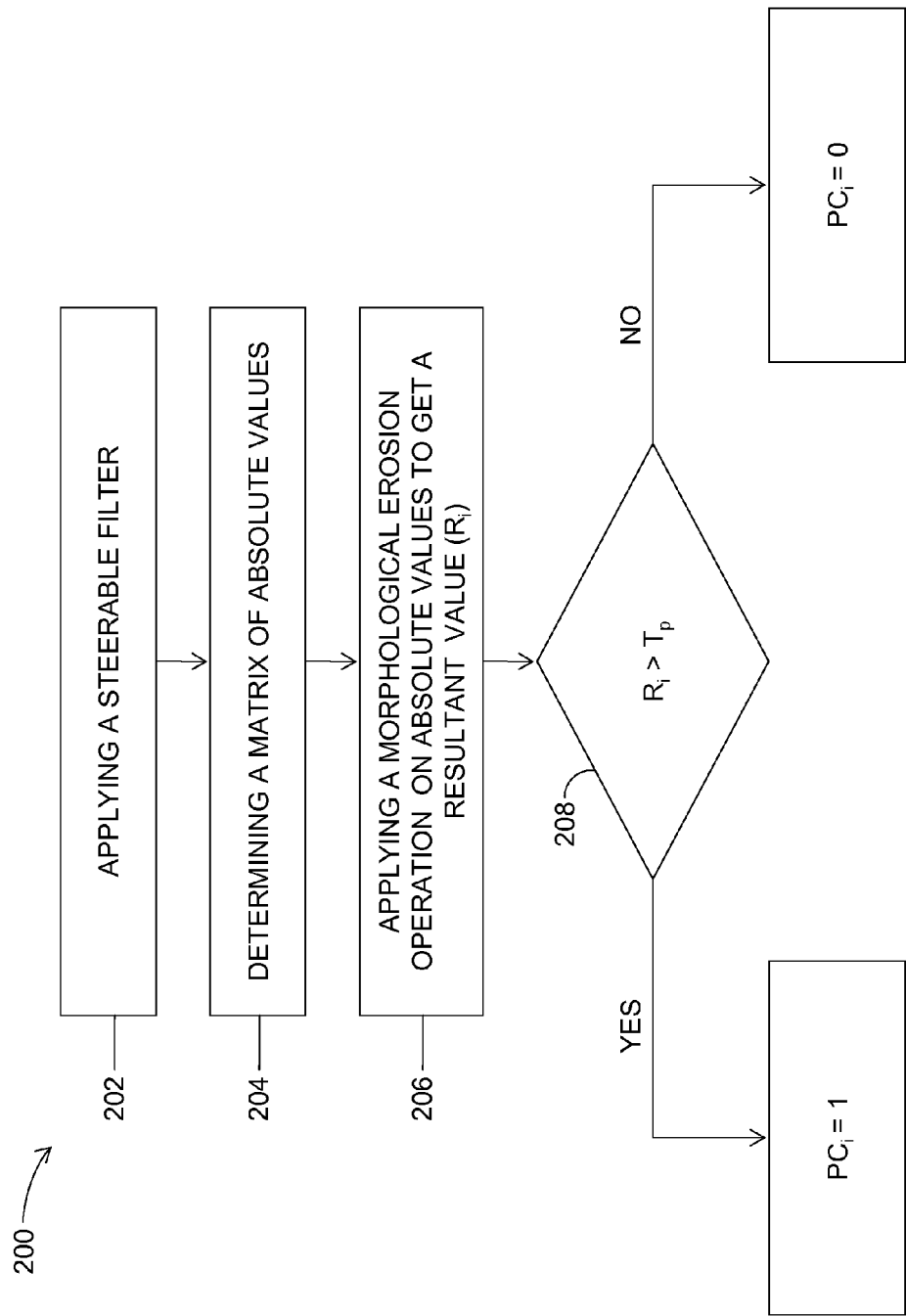
FIG. 2 represents a flowchart illustrating the process of calculating presence count statistics for the pixels present in a buffer.

At step (112) a presence count ($PC_i$) for each pixel of each buffer in the first predetermined number of frames is calculated. FIG. 2 represents a flowchart illustrating the process (200) for calculating the presence count statistics for the pixels present in a buffer. The presence count for each pixel is calculated by applying (202) a steerable filter having a predetermined number of orientations and predetermined size centered at the pixel. In an aspect, the steerable filter may be a Sobel filter, a Prewitt filter, a Roberts cross filter and the like with a variable number of orientations. Then at step (204), a matrix of absolute values is determined having the output of the steerable filters applied over the pixels. At step (206) a morphological erosion operation is applied over the matrix of absolute values using a mask to receive a resultant value. Finally, at step (208) the resultant value ($R_i$) of the morphological erosion operation is compared with a predefined threshold ($T_p$). In case, the resultant value is greater than a predefined threshold (Tp) value then the presence count is set as 1, else the presence count is set as 0. For example, a gradient filter may be used with 8 orientations each of the orientation with a shift of 45 degrees. Such filters may then be applied to each pixel and absolute of output values may be captured in a 3×3 size buffer storage. Then a morphological erosion operation may be performed on such a 3×3 size buffer storage using a 3×3 mask. The output of this erosion operation is then compared against a predetermined threshold (Tp). Accordingly, the presence count may be set as 1 or 0.

Figure 3:
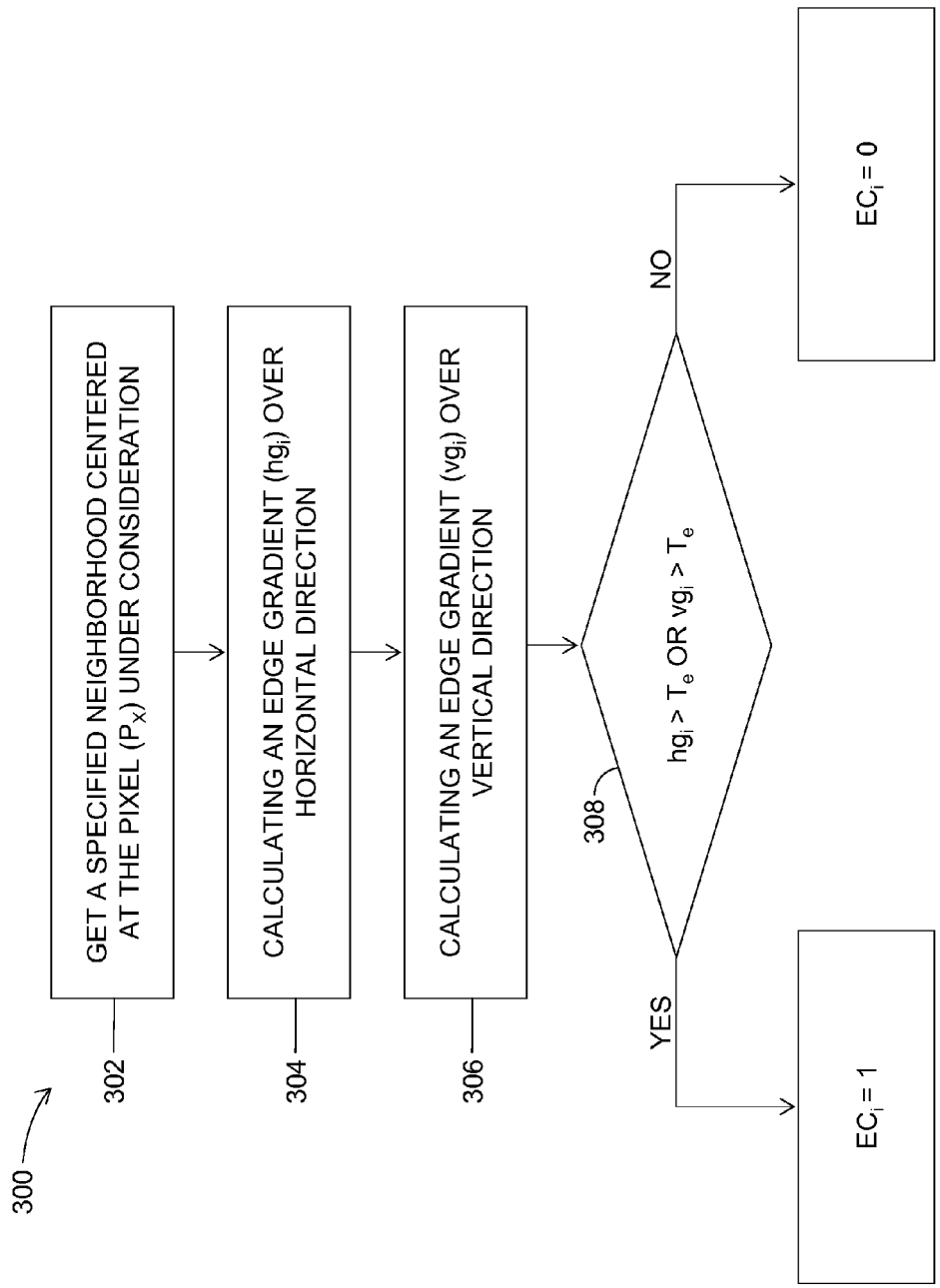
FIG. 3 represents a flowchart illustrating the process of calculating edge count statistics for the pixels present in a buffer.

Upon calculating the presence count ($PC_i$) for the pixels, an edge count for each pixel of each buffer is calculated at step (114). FIG. 3 represents a flowchart illustrating the process (300) of calculating edge count statistics ($EC_i$) for the pixels present in a buffer. The edge count may be an array for storing the edge count for each pixel. At step (302) a specified neighborhood around a pixel under consideration is determined. Then at step (304) and step (306) edge gradient for each pixel under consideration is determined in horizontal direction ($hg_i$) as well as in the vertical direction ($vg_i$) by using the determined neighborhood pixels. At step (308) the edge gradient in horizontal direction as well as the edge gradient in vertical direction is compared with a predetermined threshold ($T_e$). In case, the edge gradient in horizontal direction ($hg_i$) or the edge gradient in the vertical direction ($vg_i$) are greater than the predetermined threshold ($T_e$) then the edge count ($EC_i$) is set as 1, else the edge count ($EC_i$) is set as 0. In an aspect, the edge gradient in a single direction i.e. either horizontal direction or vertical direction may also be taken into consideration for determining the gradient.

Once the Presence count ($PC_i$) and the Edge count ($EC_i$) have been calculated, step (116) is processed wherein the cumulative difference between the Presence count ($PC_i$) and the Edge count ($EC_i$) is compared with a predefined first threshold ($T_1$). In case, the cumulative difference between the presence count and the edge count for a particular pixel in the first predefined number of frames is greater than the predefined first threshold ($T_1$) then that particular pixel is stored as a candidate pixel, as indicated in step (118). Once all the pixels in the first determined number of frames have been processed and the candidate pixels amongst them are determined and stored, the one or more candidate pixels are then tracked in the second predetermined number of frames in step (120). Upon tracking, the candidate pixels are validated at step (122) based on one or more conditions.

Figure 4:
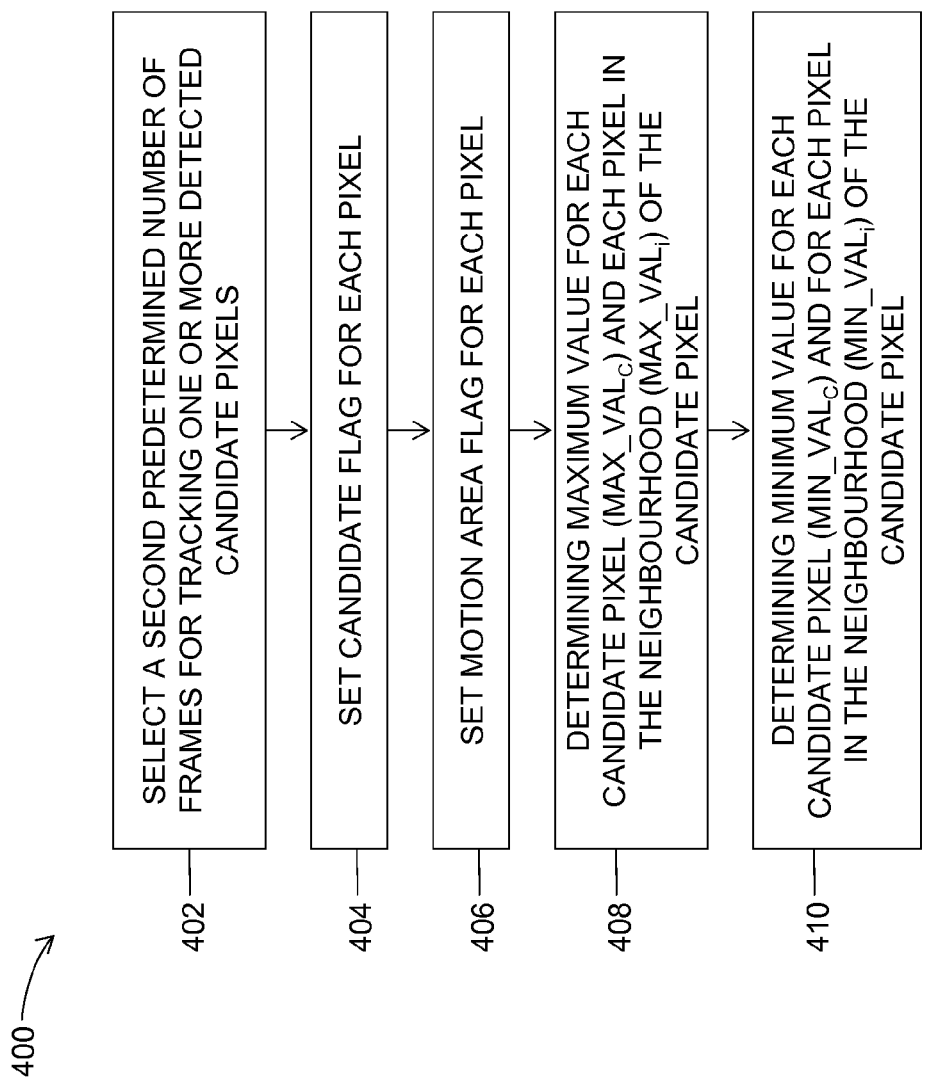
FIG. 4 represents a flowchart illustrating the process of tracking the candidate pixels.

FIG. 4 represents a flowchart illustrating the process (400) of tracking the candidate pixels in detail. Initially, the second predetermined number of frames is selected (402). Specifically, the candidate pixels as determined above are further processed in the corresponding location in the second predetermined number of frames for tracking as well as validation. At step (404) a candidate flag of each of the one or more candidate pixels is set based on the presence count and edge count of the one or more candidate pixels. In an aspect, the candidate flag of the candidate pixel is set as 1 if the presence count of that pixel is 1 and the edge count is 0 else the candidate flag is set as 0. Complete statistics of Candidate flag over the entire second predetermined number of frames is maintained for each candidate pixel.

Figure 5:
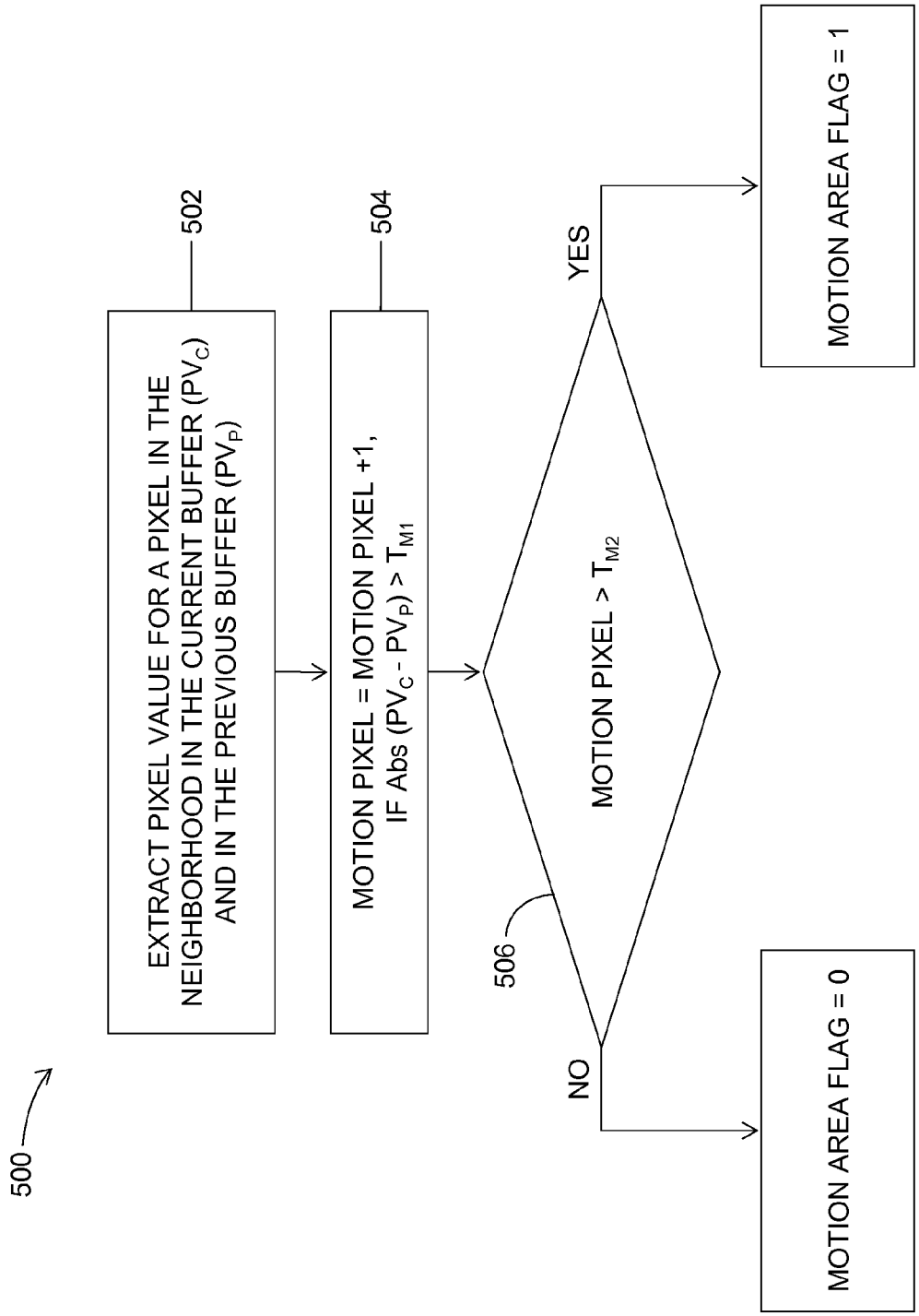
FIG. 5 represents a flowchart illustrating the process of calculating motion area flag.

At step (406) a motion area flag is set for each of the one or more candidate pixels based on a count of motion pixels in the neighborhood of the candidate, wherein the neighborhood is of a predetermined size. FIG. 5 represents a flowchart illustrating the process (500) of calculating motion area flag. First a neighborhood of predetermined size is considered and a pixel value for each pixel in the current buffer ($PV_c$) and in the previous buffer ($PV_p$) is extracted (502). The current buffer ($PV_c$) is a buffer in the current frame and the previous buffer ($PV_p$) is the corresponding buffer in the previous frame. Then at step (504), an absolute difference between the pixel value in the current buffer ($PV_c$) and pixel value in the previous buffer ($PV_p$) is calculated for each candidate pixel and such absolute difference is compared with a first threshold ($T_{M1}$). All the pixels with absolute difference above first threshold ($T_{M1}$) are counted in a MOTION PIXEL storage buffer. As indicated in step (506), the total number of pixels (MOTION PIXEL) with absolute differences greater than the threshold $T_{M1}$ are compared with a predetermined threshold ($T_{M2}$), if the number of pixels comes out to be greater than a predetermined threshold ($T_{M2}$), then the Motion Area flag is marked as 1 else 0. In an aspect, complete statistics of Motion Area flag over the entire sequence is maintained for each candidate pixel.

In step (408) a maximum pixel value ($MAX\_VAL_C$) for each candidate pixel and maximum pixel value ($MAX\_VAL$) for each pixel in the neighborhood of each of the candidate pixels in the second predetermined number of frames is calculated. Similarly, in step (410) a minimum pixel value ($MIN\_VAL_C$) for each candidate pixel and minimum pixel value ($MIN\_VAL_i$) for each pixel in the neighborhood of each of the candidate pixels in the second predetermined number of frames is calculated. For example, if for any sequence, the pixel value varies from 10 to 50 at pixel location (x,y), then the minimum value for that pixel will be 10 and maximum value will be 50.

Figure 6A:
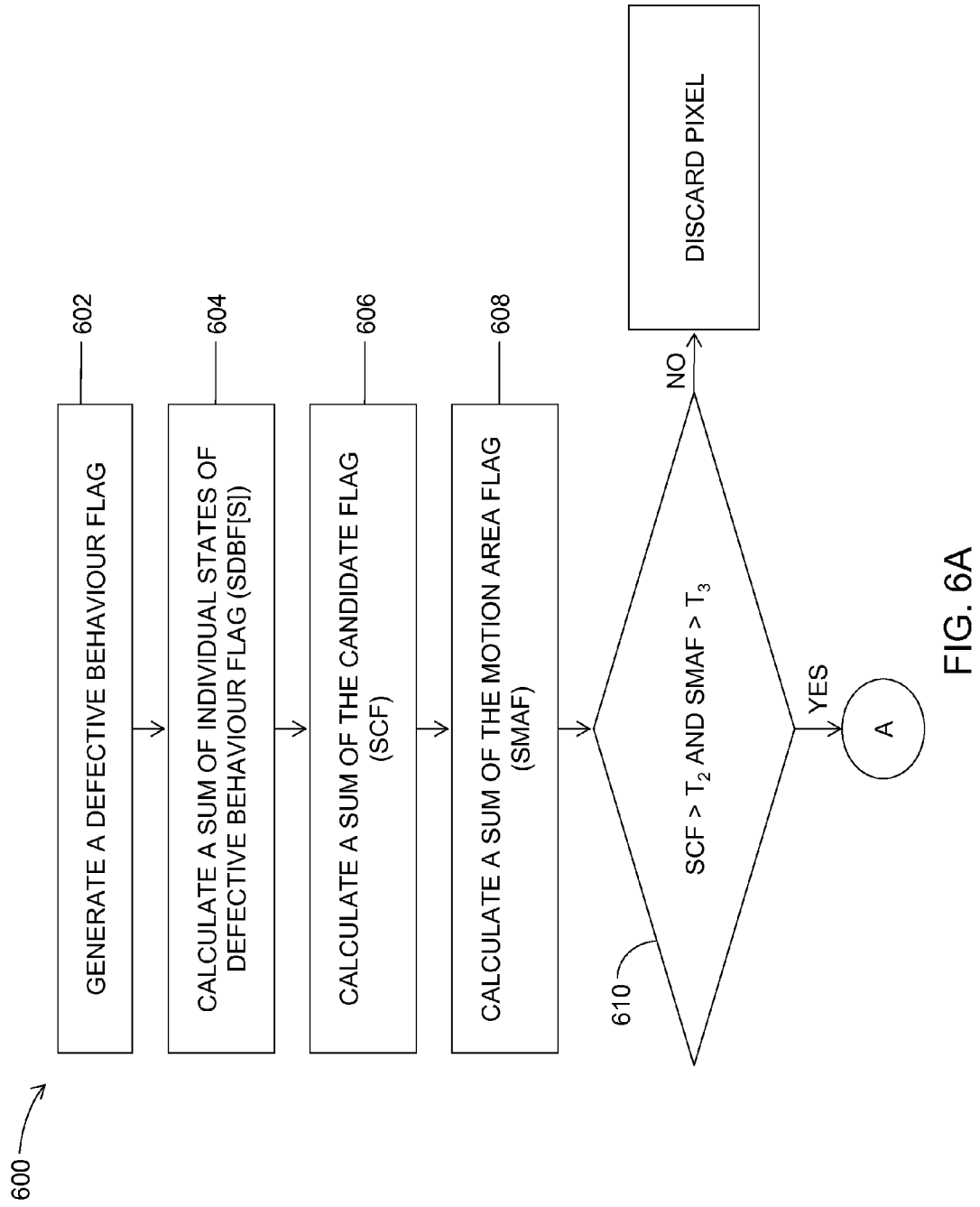
FIG. 6A and FIG. 6B represent a flowchart illustrating the process of validating the detected candidate pixels.
Figure 6B:
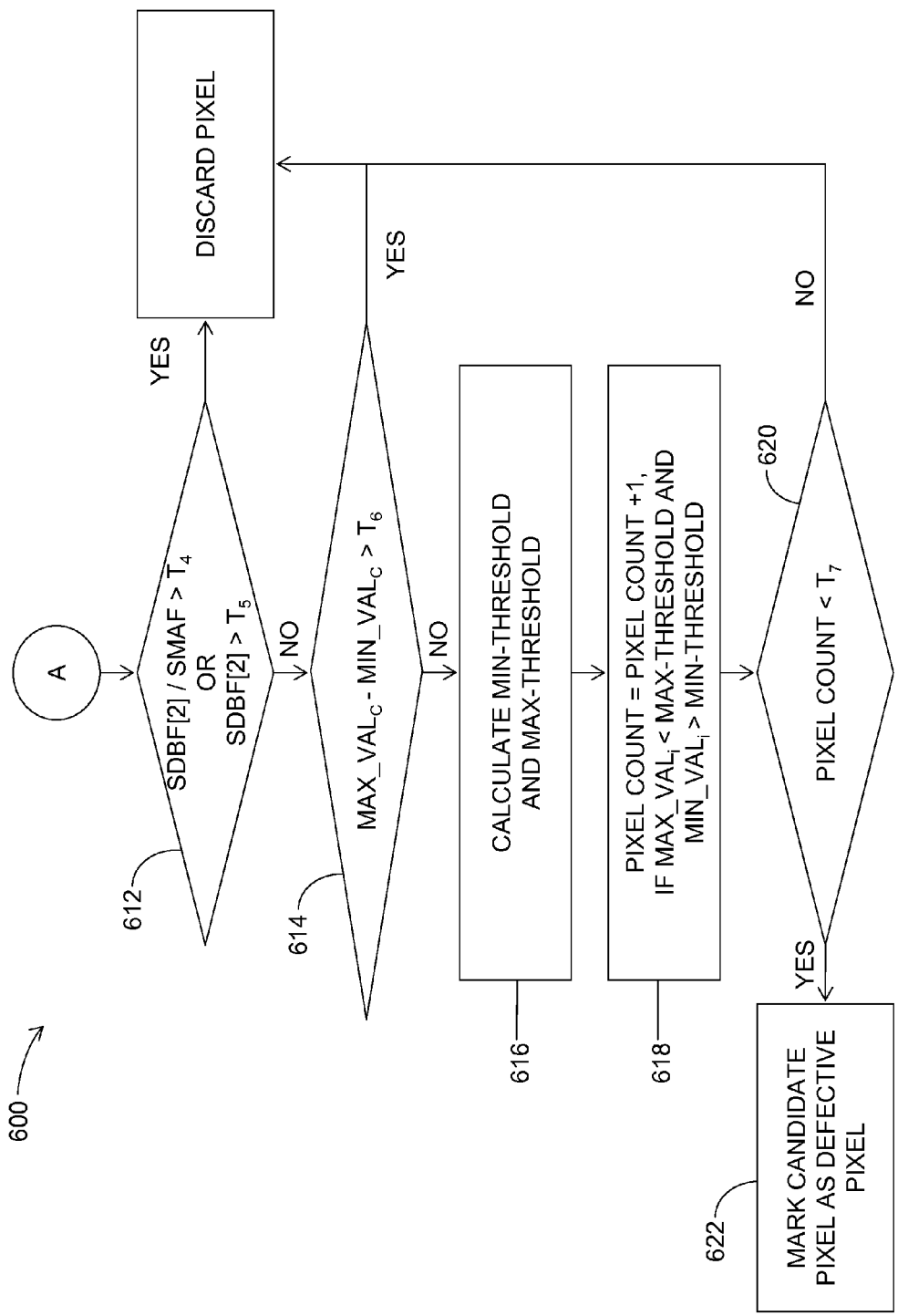

Once all the frames for a sequence are processed, then the stored statistics for each candidate pixel is used for validation of these candidate pixels. FIG. 6A and FIG. 6B represent a flowchart illustrating the process (600) for validating the detected candidate pixels. For validation, a Defective Behavior Statistics comprising of defective behavior flag for each pixel is calculated in step (602) with help of 'Candidate flag' and 'Motion Area flag'. FIG. 7 represents a table illustrating the determination of the defective behavior flag. Then a post-processing step is applied to this statistics. In this step, any state of 'Defective Behavior flag' coming out to be 3, preceded by 2, is converted to 1 and the corresponding value in 'Motion Area flag' statistics is changed to 0.

In step (604), a count of pixels in the individual states of defective behavior flag (SDBF[s]) is calculated. In step (606), a sum of the candidate flag (SCF) for each of the one or more candidate pixels over all the second predetermined number of frames is calculated. Then, in step (608) a sum of the motion area flag (SMAF) is calculated for each of the one or more candidate pixels over all the second predetermined number of frames. Thereafter, a set of predefined conditions are applied on the candidate pixel statistics for validating the candidate pixel as a defective pixel.

In step (610), the sum of candidate flag of the candidate pixel is compared with a second predetermined threshold ($T_2$) and the sum of motion area flag of the candidate pixel is compared with a third predetermined threshold ($T_3$). In case, the sum of candidate flag (SCF) of the candidate pixel is greater than the second predetermined threshold ($T_2$) and the sum of motion area flag of the candidate pixel is greater than the third predetermined threshold ($T_3$), then the step (612) is processed else the candidate pixel is rejected.

In step (612), a ratio of total count of the sum of defective behavior flag of the candidate pixel that is not visible in motion area (i.e. the candidate pixels with defective behavior flag set as 2) to the sum of motion area flag of the candidate pixel (SMAF) over the second predetermined number of frames is compared with a fourth predetermined threshold ($T_4$). Also, the total count of the sum of defective behavior flag of the candidate pixel that is not visible in motion area (i.e. the candidate pixels with defective behavior flag set as 2) is compared with a fifth predetermined threshold ($T_5$). In case, the determined ratio is greater than the fourth predetermined threshold ($T_4$) or if the sum of defective behavior flag of the candidate pixel that is not visible in motion area is greater than the fifth predetermined threshold ($T_5$) then the pixel is discarded, else the step (614) is processed.

In step (614), the difference of the maximum value and the minimum value of the candidate pixel as determined during the tracking stage are compared with a sixth predetermined threshold ($T_6$). In case, the difference of the maximum value and the minimum value is greater than the sixth predetermined threshold ($T_6$) then the pixel is discarded else a min-threshold and a max-threshold is calculated (616). The min-threshold and max-threshold values are based on the maximum value and minimum value of the candidate pixel over second predetermined number of frames.

In step (618), a pixel count in the predetermined neighborhood of candidate pixel is calculated. Such pixel count in the predetermined neighborhood is the number of pixels having minimum value and maximum value within the determined min-threshold and max-threshold. Finally in step (620), the pixel count determined in step (618) is compared with a seventh predetermined threshold value ($T_7$), if the pixel count is less than the seventh predetermined threshold ($T_7$) value, then the candidate pixel is marked as the defective pixel. All the threshold values as utilized in the present invention and as described within the present disclosure are predefined based on the experimentation of the method on various test cases and may be easily selected by a person skilled in the art.

Figure 8:
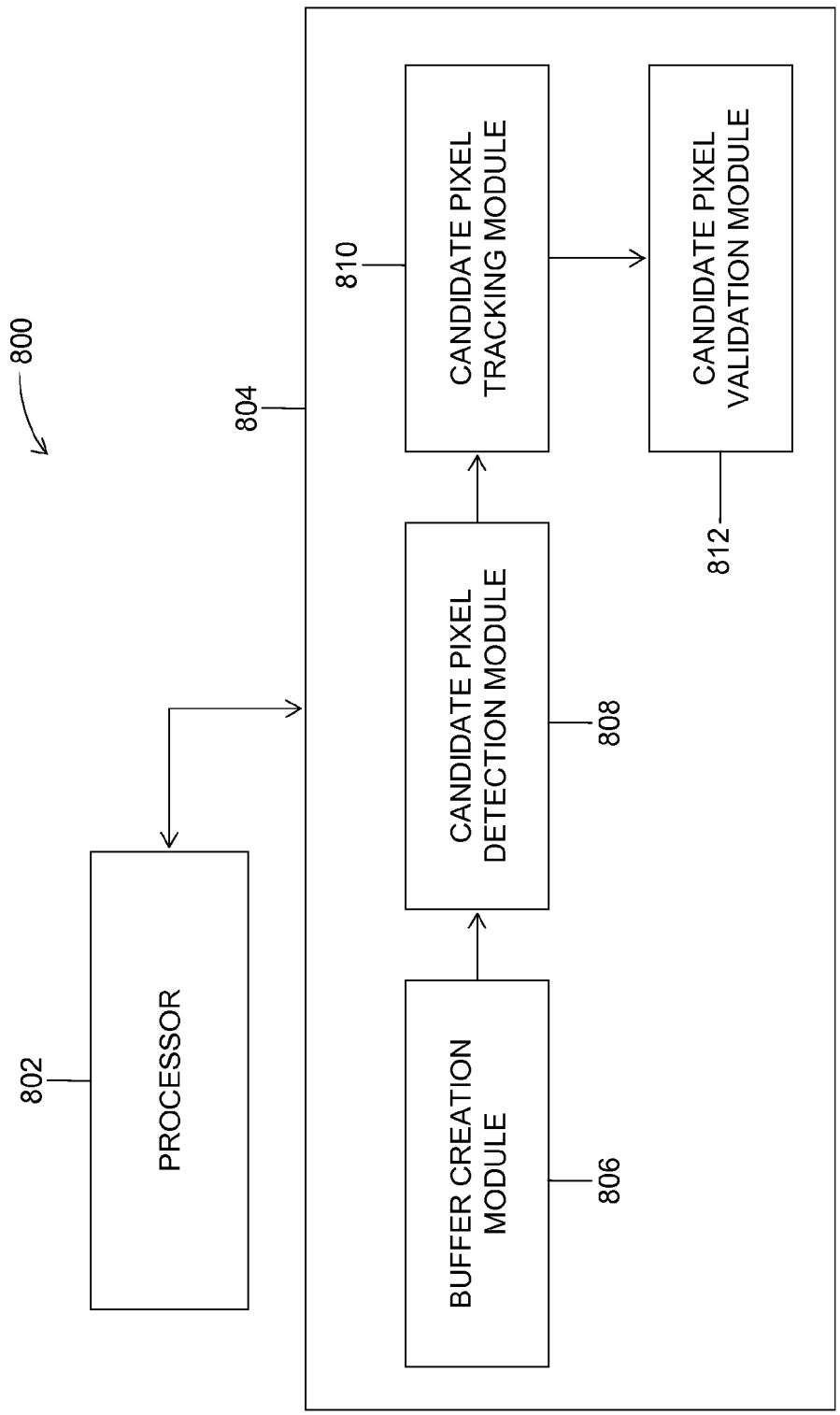
FIG. 8 represents a block diagram illustrating a system for detection of the defective pixels in a video sequence, according to an embodiment.

FIG. 8 represents a block diagram illustrating a system (800) for detection of the defective pixels in a video sequence, according to an embodiment. The system (800) comprises of a processor (802) and an associated memory (804) for storing one or more modules. The memory comprises of a buffer creation module (806), a candidate pixel detection module (808), a candidate pixel tracking module (810), and a candidate pixel validation module (812).

The buffer creation module (806) is configured for determining one or more frames of a single scene and determining a plurality of buffers of each frame related to the single scene, wherein each buffer consists of a matrix of pixels.

The candidate pixel detection module (808) is configured for detecting one or more candidate pixels for a first predefined number of frames by calculating a presence count for each pixel of each buffer; calculating an edge count for each pixel of each buffer; and storing a pixel location of a pixel as a candidate pixel if cumulative difference between the presence count and the edge count for pixels in the first predefined number of frames is greater than a predefined first threshold.

The candidate pixel tracking module (810) is configured for tracking the detected one or more candidate pixels for a second predetermined number of frames, by setting a candidate flag of each of the one or more candidate pixels based on the presence count and edge count of the one or more candidate pixels; setting a motion area flag of each of the one or more candidate pixels based on a count of motion pixels in the neighborhood of the candidate, wherein the neighborhood is of a predetermined size; and calculating a minimum pixel value and a maximum pixel value for each candidate pixel and each pixel in the neighborhood of each of the candidate pixels in the second predetermined number of frames.

The candidate pixel validation module (812) is configured for validating the one or more candidate pixels for presence of defect, the steps comprising of determining a defective behavior flag of each of the one or more candidate pixels based on the candidate flag and the motion area flag of each of the one or more candidate pixels; determining a sum of the candidate flag and a sum of the motion area flag for each of the one or more candidate pixels over all the second predetermined number of frames; marking a candidate pixel from the one or more candidate pixels as a defective pixel on one or more predefined conditions, the processor being configured for accessing the memory and executing the modules stored in the memory.

In an embodiment, the candidate pixel validation module (812) when executed by the processor (802) may be configured for comparing the sum of candidate flag of the candidate pixel with a second predetermined threshold and comparing the sum of motion area flag of the candidate pixel with a third predetermined threshold, if the sum of candidate flag of the candidate pixel is greater than the second predetermined threshold and the sum of motion area flag of the candidate pixel is greater than the third predetermined threshold, then comparing a ratio of total count of the sum of defective behavior flag of the candidate pixel that is not visible in motion area to the sum of motion area flag of the candidate pixel over the second predetermined number of frames with a fourth predetermined threshold and comparing the sum of defective behavior flag of the candidate pixel that is not visible in motion area over the second predetermined number of frames with a fifth predetermined threshold, if the ratio is greater than the fourth predetermined threshold or if the sum of defective behavior flag of the candidate pixel that is not visible in motion area is greater than the fifth predetermined threshold then the pixel is discarded, else comparing the difference of the maximum value and the minimum value of the candidate pixel in the second predetermined number of frames with a sixth predetermined threshold, if the difference is greater than the sixth predetermined threshold then the pixel is discarded else a min-threshold and a max-threshold is calculated based on the maximum value and minimum value of the candidate pixel over second predetermined number of frames; calculating a pixel count in the predetermined neighborhood of candidate pixel having minimum value and maximum value within the min-threshold and max-threshold; comparing the pixel count with a seventh predetermined threshold value, if the pixel count is less than the seventh predetermined threshold value over the second predetermined number of frames, then the candidate pixel is marked as the defective pixel by the candidate pixel validation module being executed by the processor.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

In various embodiments, the article(s) of manufacture (e.g., the computer program products) containing the computer programming code may be used by executing the code directly from the computer-readable medium or by copying the code from the computer-readable medium into another computer-readable medium (e.g., a hard disk, RAM, etc.) or by transmitting the code on a network for remote execution. Various methods described herein may be practiced by combining one or more computer-readable media containing the code according to the present invention with appropriate standard computer hardware to execute the code contained therein. An apparatus for practicing various embodiments of the present invention may involve one or more computers (or one or more processors within a single computer, or one or more processor cores) and storage systems containing or having network access to computer program(s) coded in accordance with various methods described herein, and the method steps of the invention could be accomplished by modules, routines, subroutines, or subparts of a computer program product.

Moreover, although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method for detecting defective pixels in a video sequence having a plurality of frames, the method comprising:

determining one or more frames of a single scene and determining a plurality of buffers of each frame related to the single scene, wherein each buffer consists of a matrix of pixels;

detecting one or more candidate pixels for a first predefined number of frames, the steps comprising of:

calculating a presence count for each pixel of each buffer;

calculating an edge count for each pixel of each buffer; and storing a pixel location of a pixel as a candidate pixel if cumulative difference between the presence count and the edge count for pixels in the first predefined number of frames is greater than a predefined first threshold;

tracking the detected one or more candidate pixels for a second predetermined number of frames, the steps comprising of:

setting a candidate flag of each of the one or more candidate pixels based on the presence count and edge count of the one or more candidate pixels;

setting a motion area flag of each of the one or more candidate pixels based on a count of motion pixels in the neighborhood of the candidate, wherein the neighborhood is of a predetermined size; and calculating a minimum pixel value and a maximum pixel value for each candidate pixel and each pixel in the neighborhood of each of the candidate pixels in the second predetermined number of frames;

and, validating the one or more candidate pixels for presence of defect, the steps comprising of:

determining a defective behavior flag of each of the one or more candidate pixels based on the candidate flag and the motion area flag of each of the one or more candidate pixels;

determining a sum of the candidate flag and a sum of the motion area flag for each of the one or more candidate pixels over all the second predetermined number of frames; and marking a candidate pixel from the one or more candidate pixels as a defective pixel on one or more predefined conditions.

2. The method as claimed in claim 1, wherein the one or more frames of a single scene are first converted to RGB format and then buffers are determined.

3. The method as claimed in claim 1, wherein the one or more conditions for marking a candidate pixel as a defective pixel comprises of:

comparing the sum of candidate flag of the candidate pixel with a second predetermined threshold and comparing the sum of motion area flag of the candidate pixel with a third predetermined threshold, if the sum of candidate flag of the candidate pixel is greater than the second predetermined threshold and the sum of motion area flag of the candidate pixel is greater than the third predetermined threshold, then comparing a ratio of total count of the sum of defective behavior flag of the candidate pixel that is not visible in motion area to the sum of motion area flag of the candidate pixel over the second predetermined number of frames with a fourth predetermined threshold and comparing the sum of defective behavior flag of the candidate pixel that is not visible in motion area over the second predetermined number of frames with a fifth predetermined threshold, if the ratio is greater than the fourth predetermined threshold or if the sum of defective behavior flag of the candidate pixel that is not visible in motion area is greater than the fifth predetermined threshold then the pixel is discarded, else comparing the difference of the maximum value and the minimum value of the candidate pixel in the second predetermined number of frames with a sixth predetermined threshold, if the difference is greater than the sixth predetermined threshold then the pixel is discarded else a min-threshold and a max-threshold is calculated based on the maximum value and minimum value of the candidate pixel over second predetermined number of frames;

calculating a pixel count in the predetermined neighborhood of candidate pixel having minimum value and maximum value within the min-threshold and max-threshold; and comparing the pixel count with a seventh predetermined threshold value, if the pixel count is less than the seventh predetermined threshold value over the second predetermined number of frames, then the candidate pixel is marked as the defective pixel.

4. The method as claimed in claim 1, wherein determining one or more frames of the single scene is based on one of the technique selected from a group consisting of Histogram difference, Edge Change Ratio, and Motion Vector Statistics.

5. The method as claimed in claim 1, wherein the presence count for each pixel is calculated by:

applying a steerable filter having a predetermined number of orientations and predetermined size centered at the pixel;

determining a matrix of absolute values of output of the steerable filters applied over the pixel;

applying a morphological erosion operation over the matrix of absolute values using a mask to receive a resultant value; and setting the presence count as 1 if the resultant value is greater than a predefined threshold ($T_p$) value.

6. The method as claimed in claim 5, wherein the steerable filter is selected from a group consisting of Sobel filter, Prewitt filter, and Roberts cross filter.

7. The method as claimed in claim 1, wherein the edge count for each pixel is calculated by:

calculating an edge gradient over horizontal direction;
calculating an edge gradient over vertical direction; and
setting the edge count as 1 if the edge gradient over horizontal direction or the edge gradient over vertical direction is greater than a predefined threshold ($T_e$) value.

8. The method as claimed in claim 1, wherein setting the candidate flag of the candidate pixel comprises of:

setting the candidate flag as 1 if the presence count is 1 and the edge count is 0 else the candidate flag is set as 0.

9. A system for detecting defective pixels in a video sequence having a plurality of frames, the system comprising a processor and an associated memory for storing one or more modules, wherein the memory comprises:

a buffer creation module configured for determining one or more frames of a single scene and determining a plurality of buffers of each frame related to the single scene, wherein each buffer consists of a matrix of pixels;

a candidate pixel detection module configured for detecting one or more candidate pixels for a first predefined number of frames, the steps comprising of:

calculating a presence count for each pixel of each buffer;

calculating an edge count for each pixel of each buffer; and storing a pixel location of a pixel as a candidate pixel if cumulative difference between the presence count and the edge count for pixels in the first predefined number of frames is greater than a predefined first threshold;

a candidate pixel tracking module configured for tracking the detected one or more candidate pixels for a second predetermined number of frames, the steps comprising of:

setting a candidate flag of each of the one or more candidate pixels based on the presence count and edge count of the one or more candidate pixels;

setting a motion area flag of each of the one or more candidate pixels based on a count of motion pixels in the neighborhood of the candidate, wherein the neighborhood is of a predetermined size; and calculating a minimum pixel value and a maximum pixel value for each candidate pixel and each pixel in the neighborhood of each of the candidate pixels in the second predetermined number of frames;

and, a candidate pixel validation module configured for validating the one or more candidate pixels for presence of defect, the steps comprising of:

determining a defective behavior flag of each of the one or more candidate pixels based on the candidate flag and the motion area flag of each of the one or more candidate pixels;

determining a sum of the candidate flag and a sum of the motion area flag for each of the one or more candidate pixels over all the second predetermined number of frames; and marking a candidate pixel from the one or more candidate pixels as a defective pixel on one or more pre-defined conditions, the processor being configured for accessing the memory and executing the modules stored in the memory.

10. The system as claimed in claim 9, wherein the candidate pixel validation module is configured for:

comparing the sum of candidate flag of the candidate pixel with a second predetermined threshold and comparing the sum of motion area flag of the candidate pixel with a third predetermined threshold, if the sum of candidate flag of the candidate pixel is greater than the second predetermined threshold and the sum of motion area flag of the candidate pixel is greater than the third predetermined threshold, then comparing a ratio of total count of the sum of defective behavior flag of the candidate pixel that is not visible in motion area to the sum of motion area flag of the candidate pixel over the second predetermined number of frames with a fourth predetermined threshold and comparing the sum of defective behavior flag of the candidate pixel that is not visible in motion area over the second predetermined number of frames with a fifth predetermined threshold, if the ratio is greater than the fourth predetermined threshold or if the sum of defective behavior flag of the candidate pixel that is not visible in motion area is greater than the fifth predetermined threshold then the pixel is discarded, else comparing the difference of the maximum value and the minimum value of the candidate pixel in the second predetermined number of frames with a sixth predetermined threshold, if the difference is greater than the sixth predetermined threshold then the pixel is discarded else a min-threshold and a max-threshold is calculated based on the maximum value and minimum value of the candidate pixel over second predetermined number of frames;

calculating a pixel count in the predetermined neighborhood of candidate pixel having minimum value and maximum value within the min-threshold and max-threshold; and comparing the pixel count with a seventh predetermined threshold value, if the pixel count is less than the seventh predetermined threshold value over the second predetermined number of frames, then the candidate pixel is marked as the defective pixel by the candidate pixel validation module being executed by the processor.

* * * * *